L. L. BARBER.
SEWING MACHINE TRIMMER ATTACHMENT.
No. 177,788.            Patented May 23, 1876.
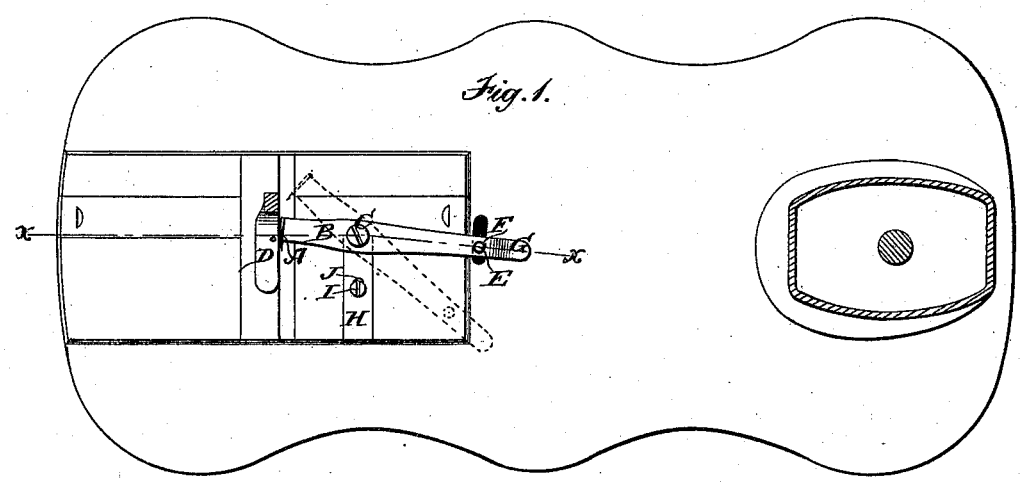
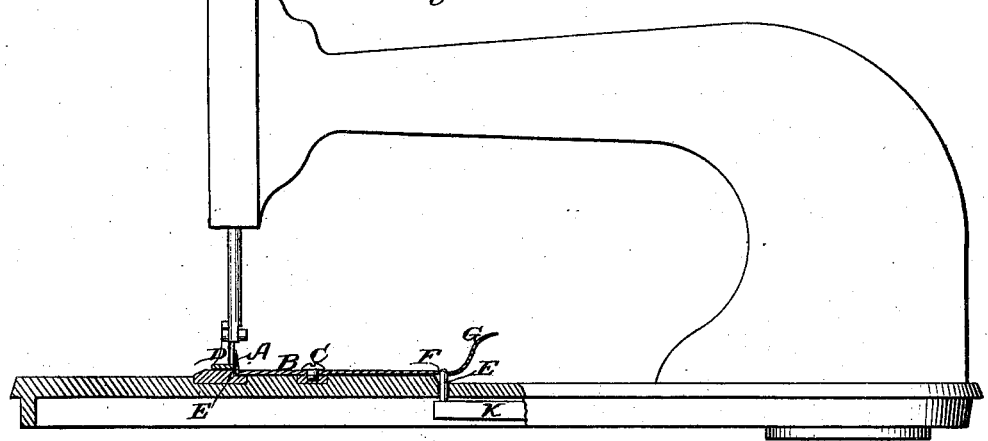
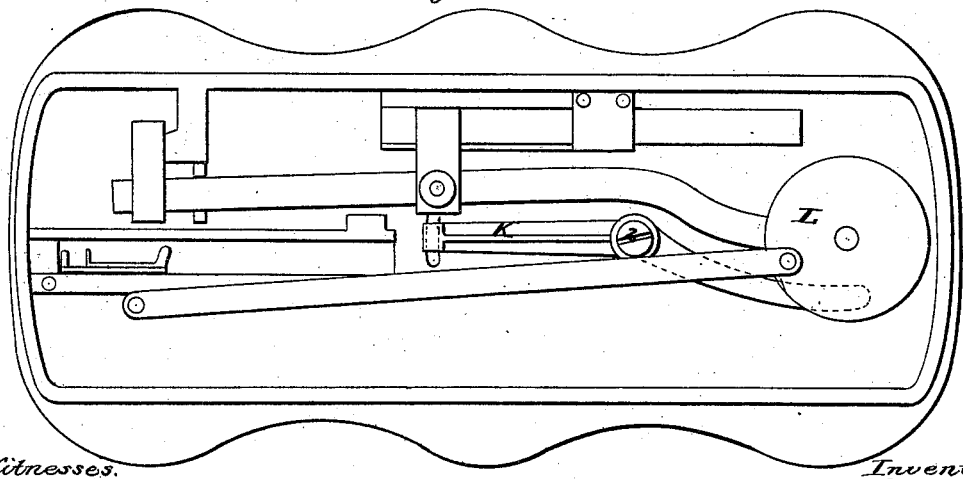

UNITED STATES PATENT OFFICE.

LYMAN L. BARBER, OF BOSTON, MASSACHUSETTS.

IMPROVEMENT IN SEWING-MACHINE TRIMMER ATTACHMENTS.

Specification forming part of Letters Patent No. 177,788, dated May 23, 1876; application filed February 7, 1876.

*To all whom it may concern:*

Be it known that I, LYMAN L. BARBER, of Boston, in the county of Suffolk and State of Massachusetts, have invented certain Improvements in Trimmer Attachments for Sewing-Machines, of which the following is a specification:

In the accompanying drawing, forming a part of this specification, Figure 1 represents a top plan of a sewing-machine provided with my improvement. Fig. 2 represents a section on line $x$ $x$, Fig. 1; and Fig. 3 represents a bottom-plan view of the bed of the sewing-machine, showing the lever that imparts motion to the trimmer.

This invention relates to cutting attachments for sewing-machines, and is an improvement on my Patent No. 156,267, dated October 27, 1874, in which a peculiarly-shaped knife or trimmer is employed, having a shank which is pivoted on the bed of the machine, like a lever of the first order, and operated by the motive power of the machine, so as to give the knife a reciprocating motion in the line of the feed of the machine.

My present invention has for its object, first, to enable the knife or trimmer to be easily and quickly thrown out of its operative position without detaching it from the machine when it is desired to discontinue the trimming operation, and to be as readily returned to its operative position when the trimming operation is to be resumed; secondly, to provide improved means for adjusting the knife or trimmer so as to compensate for the wear of its edge, and keep the latter in the proper position relatively to the work-holding parts.

To these ends my invention consists, first, in making the knife shank or plate readily detachable from its motor, so that it may be turned on its fulcrum, and carry the knife away from its operative position.

My invention consists, secondly, in attaching the fulcrum of the knife or trimmer to a slotted plate, which is adjustable in a line parallel with the direction of the feed, all of which I will now proceed to describe.

In the drawings, A represents the knife or trimmer, and B represents the plate or shank on which the knife A is formed, these parts being similar to the corresponding parts in my patent above mentioned, so far as the knife and its operations are concerned. The shank B is connected, at its rear end, to the part of the machine which gives it its reciprocating motion, and has its pivot or fulcrum at C, the knife A, when in operation, being in close proximity to the side of the presser-foot D, and a projection or shoulder, E, on the needle-plate.

In my former patent the shank B was made rigid, and was connected to the latch or slide that gave it motion by a pin rigidly attached to its rear end, and projecting downward through the bed of the machine. This construction rendered it necessary to detach the knife and shank from the machine when it was desirable to sew without trimming, thus involving loss of time when frequent and brief cessations of the trimming operation are necessary, as in sewing a strap into a boot or shoe, or in sewing a second or inner seam after stretching and trimming the edge. I now obviate this difficulty by making the shank readily detachable from its motor, without detaching it from the machine, thus enabling the shank to be swung on its pivot or fulcrum in such manner as to remove the knife from its operative position. This I prefer to accomplish by attaching the connecting-pin E rigidly to the motor underneath the table, causing it to project above the table a sufficient distance, rounding its upper end, providing the shank with an orifice, F, adapted to receive the pin E, making the rear end of the shank flexible, and providing it with an upturned handle, G.

By these means I am enabled at any time to raise the rear end of the shank, so as to disengage it from the pin E, and turn the shank on its pivot or fulcrum, so as to throw the knife out of place.

If desired, the same effect may be produced by adapting the pin E to be depressed below the shank, in which case a spring should be employed to hold it in place with a yielding pressure when it is engaged with the shank.

Instead of making the rear end of the shank flexible, it may be hinged, so as to be adapted to be lifted from the pin E.

The pivotal screw or fulcrum of the shank B is supported by a plate, H, which is secured to the bed of the machine by a screw, I, passing through a slot, J, in said plate. The plate H is adjustable in a line parallel with the direction of the feed by means of the screw I and slot J; consequently, when the edge of the knife A becomes worn, the plate H can be readily moved sufficiently to compensate for the wear.

In my former patent my invention was shown in connection with a rotary-feed machine. In the present instance I show a drop-feed Singer machine, and employ a horizontal lever, K, as the motor of the knife or trimmer. This lever is pivoted at 2 to the under side of the bed-plate, and is provided at one end with a pin, which enters a cam-groove in the horizontal disk L, the lever K being oscillated thereby. The opposite end of the lever is provided with the upwardly-projecting pin E, which engages with the knife-shank, as before described.

The lever constitutes cheap and simple means for operating the knife or trimmer, being operated itself by the disk that operates the shuttle and feed.

I do not, of course, limit myself to the employment of the lever K, as the pin E may be used in connection with any suitable mechanism for reciprocating the shank and knife.

I claim as my invention—

1. In combination with the operative mechanism of a sewing-machine, a trimmer constructed substantially as described, and adapted to be swung in a horizontal plane into or out of its operative position, and be thereby connected with, or disconnected from, its driver, substantially as set forth.

2. The shank B of the knife A, combined with the adjustable plate H, substantially as described, for the purpose specified.

In testimony whereof I have signed my name to this specification in the presence of two subscribing witnesses.

LYMAN L. BARBER.

Witnesses:
C. F. BROWN,
A. E. DENISON.